(12) United States Patent
Hofmann

(10) Patent No.: US 7,197,701 B2
(45) Date of Patent: Mar. 27, 2007

(54) MANAGEMENT OF HIERARCHIES

(75) Inventor: Christoph Hofmann, Wiesloch (DE)

(73) Assignee: SAP Aktiengesellschaft, Walldorf (DE)

(*) Notice: Subject to any disclaimer, the term of this patent is extended or adjusted under 35 U.S.C. 154(b) by 666 days.

(21) Appl. No.: 10/278,737

(22) Filed: Oct. 21, 2002

(65) Prior Publication Data

US 2003/0079182 A1 Apr. 24, 2003

(51) Int. Cl.
G06F 17/00 (2006.01)

(52) U.S. Cl. ........................ 715/514; 715/853

(58) Field of Classification Search .......... 715/526, 715/514, 713, 853, 907
See application file for complete search history.

(56) References Cited

U.S. PATENT DOCUMENTS

| | | | | |
|---|---|---|---|---|
| 5,701,137 A | * | 12/1997 | Kiernan et al. | 715/853 |
| 5,751,931 A | * | 5/1998 | Cox et al. | 345/440 |
| 5,786,816 A | * | 7/1998 | Macrae et al. | 715/837 |
| 5,878,421 A | * | 3/1999 | Ferrel et al. | 707/100 |
| 6,105,036 A | * | 8/2000 | Henckel | 707/104.1 |
| 6,115,044 A | | 9/2000 | Alimpich et al. | |
| 6,128,759 A | * | 10/2000 | Hansen | 714/738 |
| 6,151,024 A | | 11/2000 | Alimpich et al. | |
| 6,341,310 B1 | * | 1/2002 | Leshem et al. | 709/223 |
| 6,727,926 B1 | * | 4/2004 | Utsuki et al. | 715/853 |
| 6,757,673 B2 | * | 6/2004 | Makus et al. | 707/3 |
| 6,848,078 B1 | * | 1/2005 | Birsan et al. | 715/511 |
| 2002/0147728 A1 | * | 10/2002 | Goodman et al. | 707/104.1 |

FOREIGN PATENT DOCUMENTS

GB 2 346 717 8/2000

OTHER PUBLICATIONS

Horwitz, Susan, et al, "Generating Editing Environments Based on Relations and Attributes", ACM Transactions on Programming Languages and Systems (TOPLAS), vol. 8, Issue 4, Aug. 1986, pp. 577-608.*
Bennett, W.E., et al, "Transformations on a Dialog Tree: Rule-Based Mapping of Content to Style", Proceedings of the 2nd Annual ACM SIGGRAPH Symposium on User Interface Software and Technology, Nov. 1989, pp. 67-75.*
Prasun Dewan: "An Interitance Model for Supporting Flexible Displays of Data Structures" Software Practice & Experience, John Wiley & Sons LTD, Chichester, GB, vol. 21, No. 7, Jul. 1, 1991, pp. 719-738.

* cited by examiner

*Primary Examiner*—William Bashore
*Assistant Examiner*—Laurie Ries
(74) *Attorney, Agent, or Firm*—Fish & Richardson P.C.

(57) ABSTRACT

Computer-implemented methods, computer systems and computer program products for display state adjustment of tree-nodes. A tree has a plurality of nodes, wherein each node has a predefined control attribute and a predefined display attribute. A computer system changes the control attribute of a node that has a parent-node. The computer system adjusts the display attribute of the node with respect to the control attribute of the node and the display attribute of the parent-node according to predefined display rules. The computer system visualizes the display attribute of the node. If the node defines a sub-tree of the tree, the computer system repeats the adjusting and visualizing steps for each sub-node of the sub-tree.

31 Claims, 11 Drawing Sheets

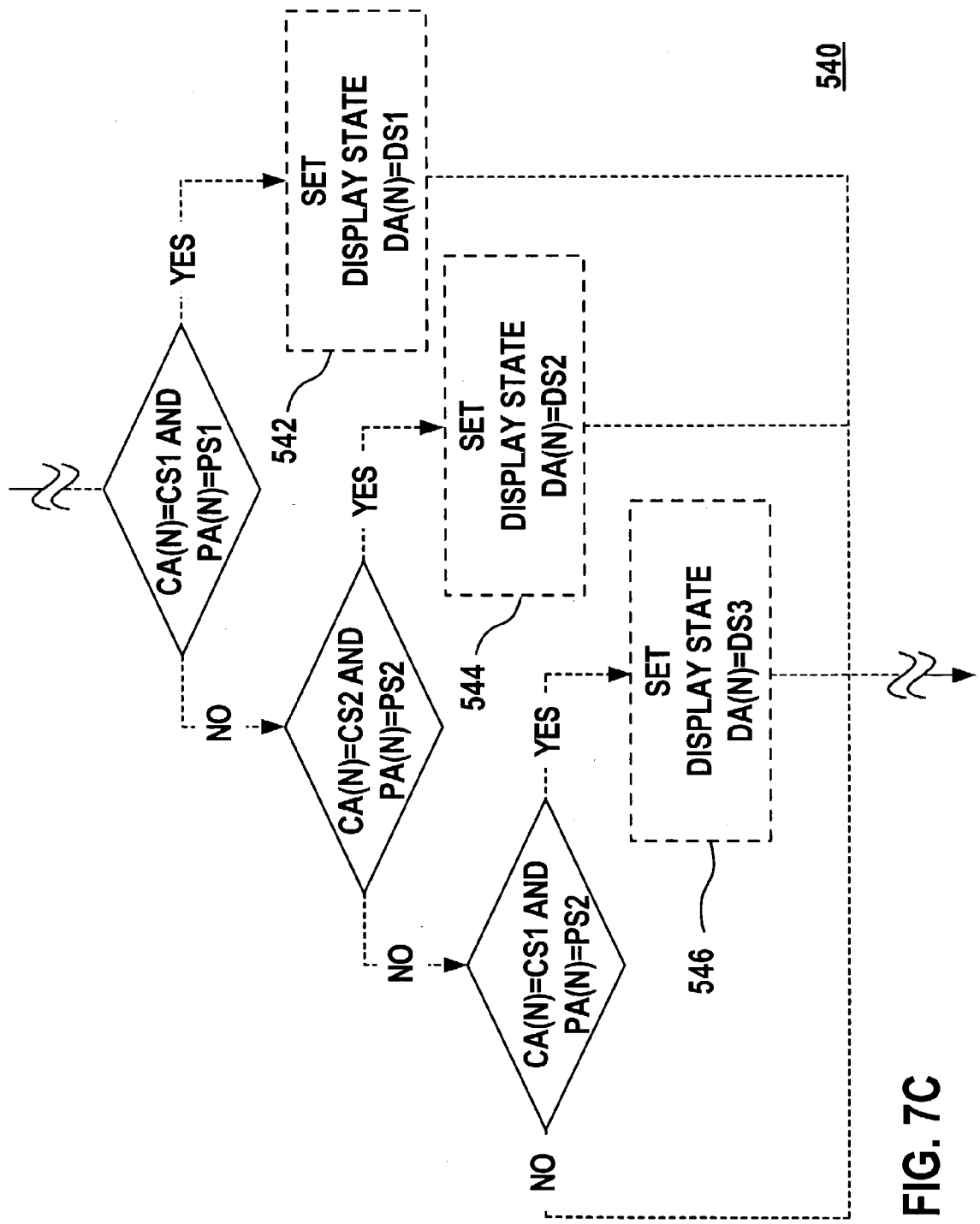

MANAGEMENT OF HIERARCHIES

BACKGROUND OF THE INVENTION

The present invention relates to management of hierarchies.

Typically, hierarchical information in a computer system is visualized for a user using a tree structure. A tree is a hierarchy having a root-node (R) and a plurality of sub-nodes (S), wherein the root-node has no parent-node (P) and each sub-node has one parent-node and can have multiple child-nodes. The hierarchy can have any number of hierarchy levels.

For example, Microsoft® Windows® Explorer displays the hierarchical directory structure of a hard drive by using a tree graphic. The root-directory of the hard drive (e.g., C:\) corresponds to a root-node at the top of the tree. Sub-directories (e.g., Program Files, Documents and Settings) of the root-directory are listed below as child-nodes of the root-node by using connection lines to the root-node indicating their hierarchical relationship. Each sub-directory can have further sub-directories with a corresponding visualization.

Some applications use tree structures to control access to an object represented by a node. Some applications use tree structures to customize a complete application system according to the individual needs of an enterprise by activating or deactivating components of the application system. In both examples, nodes in the tree can be activated (access allowed, component active) and deactivated (access denied, component inactive) to achieve the desired effect.

In some cases there is a need to temporarily deactivate nodes in a tree. For example, in preparation of a system upgrade, a system administrator may temporarily deactivates the access to all nodes in a tree by deactivating the root-node of the tree. Typically, this implies the deactivation of all sub-nodes in the tree. It is not possible to change the status of a node within a deactivated tree or sub-tree. After the system upgrade, the previous activation status of all sub-nodes in the tree has to be reestablished. In prior art systems, this is usually done manually by the system administrator.

SUMMARY OF THE INVENTION

Hence, the present invention provides computer-implemented methods, computer program products and computer systems to provide a solution to the technical problem of losing the previous control status information of a sub-node in a sub-tree of a tree, when changing the control status of the root-node of the sub-tree.

A further technical problem solved by the present invention is that a prior art system does not support changing the control status of a node that belongs to a deactivated sub-tree.

To solve the aforementioned problems, the present invention provides method, computer system and computer program product using the following features:

1a) Providing a predefined tree. The tree has a plurality of nodes, wherein each node has a predefined propagation attribute, a predefined control attribute and a predefined display attribute.

1b) Changing the control attribute of a node, wherein the node defines a sub-tree of the tree. Each node of the sub-tree has a parent-node.

1c) Calculating the propagation attribute of each node of the sub-tree depending on the node's control attribute and the propagation attribute of the corresponding parent-node according to predefined propagation rules.

1d) Adjusting the display attribute of each node of the sub-tree with respect to the node's control attribute and the node's propagation attribute according to predefined display rules.

In advantageous implementations, the control attribute of a node has two control states, such as active and inactive. More than two control states are possible.

In advantageous implementations, the propagation attribute of a node has two propagation states, such as active and inactive. More than two propagation states are possible.

In advantageous implementations, the display attribute has three display states, such as active, inactive and implicitly inactive, and the number of display states is higher than the number of control states. More than three display states are possible.

Instead of using the control attribute and the propagation attribute of a node to derive the node's display attribute, the display attribute of the node can also be derived from the control attribute of the node and the display attribute of the node's parent node. In this embodiment, the display attribute also performs a propagation function. This embodiment has the following features:

2a) Providing a predefined tree. The tree has a plurality of nodes, wherein each node has a predefined control attribute and a predefined display attribute.

2b) Changing the control attribute of a node. The node has a parent-node.

2c) Adjusting the display attribute of the node with respect to the control attribute of the node and the display attribute of the parent-node according to predefined display rules.

Optionally, this embodiment has the further features:

2d) Visualizing the display attribute of the node.

2e) When the node defines a sub-tree of the tree, repeating the 2c) adjusting and 2d) visualizing steps for each sub-node of the sub-tree.

It is advantageous to separate the control attribute and display attribute of a tree node. This allows one to have more states for the display attribute than for the control attribute. Therefore, by the setting of an appropriate display attribute for each sub-node in a sub-tree, a computer system can indicate to a user the overall propagation attribute of the sub-tree without losing the information about the control attribute of a single sub-node of the sub-tree. The user gets better control of the computer system for two reasons. First, the computer system supports the changing of the control attribute of a sub-node of a sub-tree, even when, for example, the sub-tree is deactivated. For example, in an organization, a user of a department of the organization can independently change the control attribute of nodes within the department's area of responsibility, even when a superior department of the organization has deactivated the sub-tree that corresponds to the area of responsibility of the department. And second, the computer system provides a "preview" functionality to the user that indicates the impact on the tree in case the control attribute of a node is changed.

Therefore, the present invention also provides methods, computer systems and computer program products to provide a graphical human interface for improving tree control by a user with the following features:

3a) Prompting a user with a predefined tree. The tree has a plurality of nodes, wherein each node has a predefined control attribute and a predefined display attribute.

3b) Receiving a request from the user to change the control attribute of a node that has a parent-node.

3c) Changing the control attribute of the node.

3d) Adjusting the display attribute of the node with respect to the control attribute of the node and the display attribute of the node's parent-node according to predefined display rules.

3e) Optionally, visualizing the display attribute of each node in the tree.

The aspects of the invention will be realized and attained by means of the elements and combinations particularly pointed out in the appended claims. It is to be understood that both the foregoing general description and the following detailed description are exemplary and explanatory only and are not restrictive of the invention as described.

BRIEF DESCRIPTION OF THE DRAWINGS

FIGS. 7A–C are flow charts of a further method according to the present invention.

DETAILED DESCRIPTION OF THE INVENTION

Figure 1:
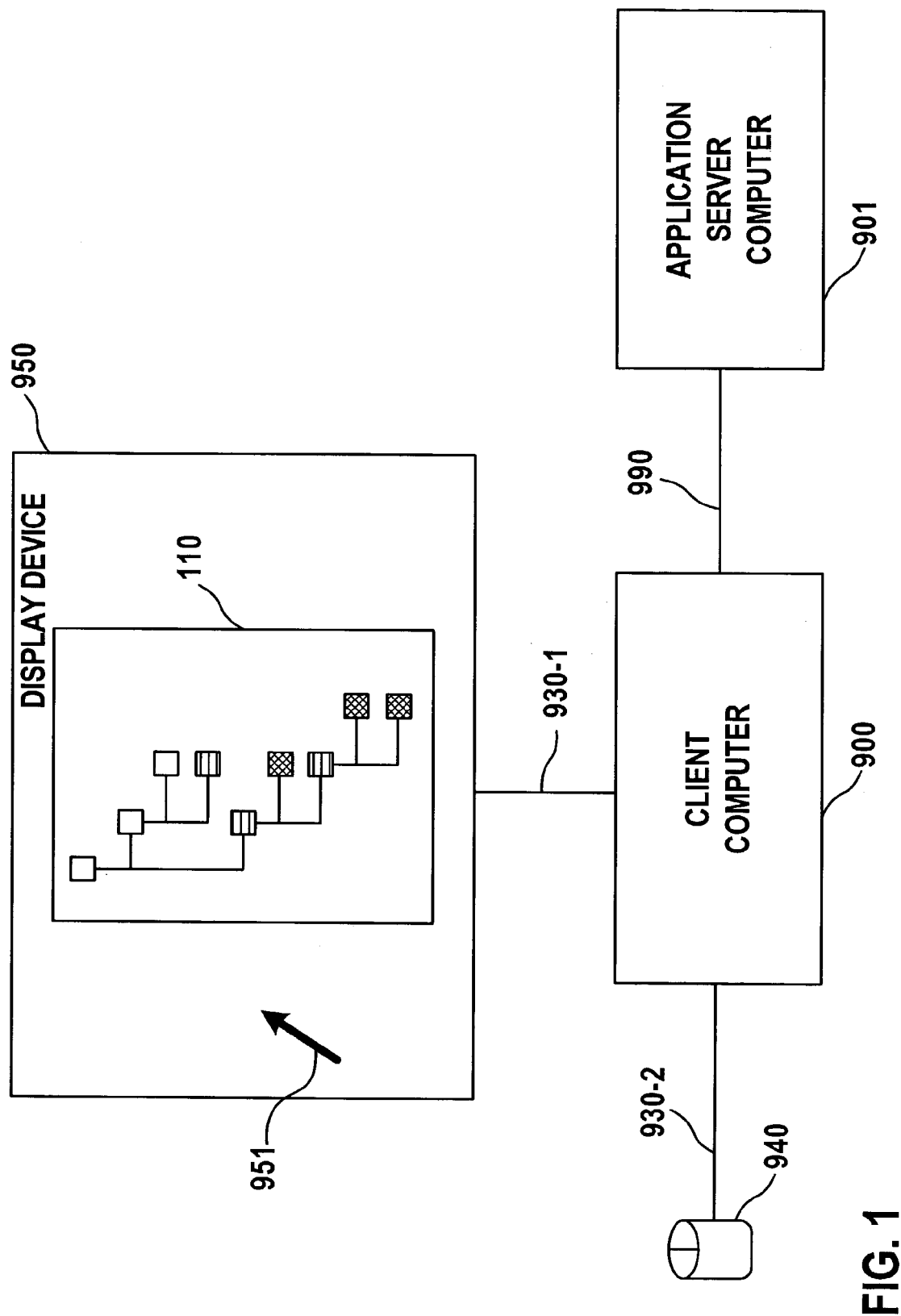
FIG. 1 illustrates details of the computer system with a typical screen view according to the present invention.

FIG. 1 shows an illustrative computer system of two computers 900, 901 with a typical screen view according to the present invention.

In this example, computer 900 serves as client computer 900 for a user to access application server computer 901 through network 990, and application computer 901 provides application data to the user, such as predefined hierarchy data. Client computer 900 also can store predefined hierarchy data. The user interacts with computer 900 by using a user interface having an input device 940 (e.g., mouse device) and output device 950 (e.g., monitor). For example, output device 950 visualizes hierarchy data as tree 110. Input device 940 is used to control cursor 951 displayed on output device 950 through client computer 900. When cursor 951 on output device 950 is moved to tree 110, the user can initiate changes of the corresponding hierarchy data by, for example, using buttons of input device 940.

Figure 2:
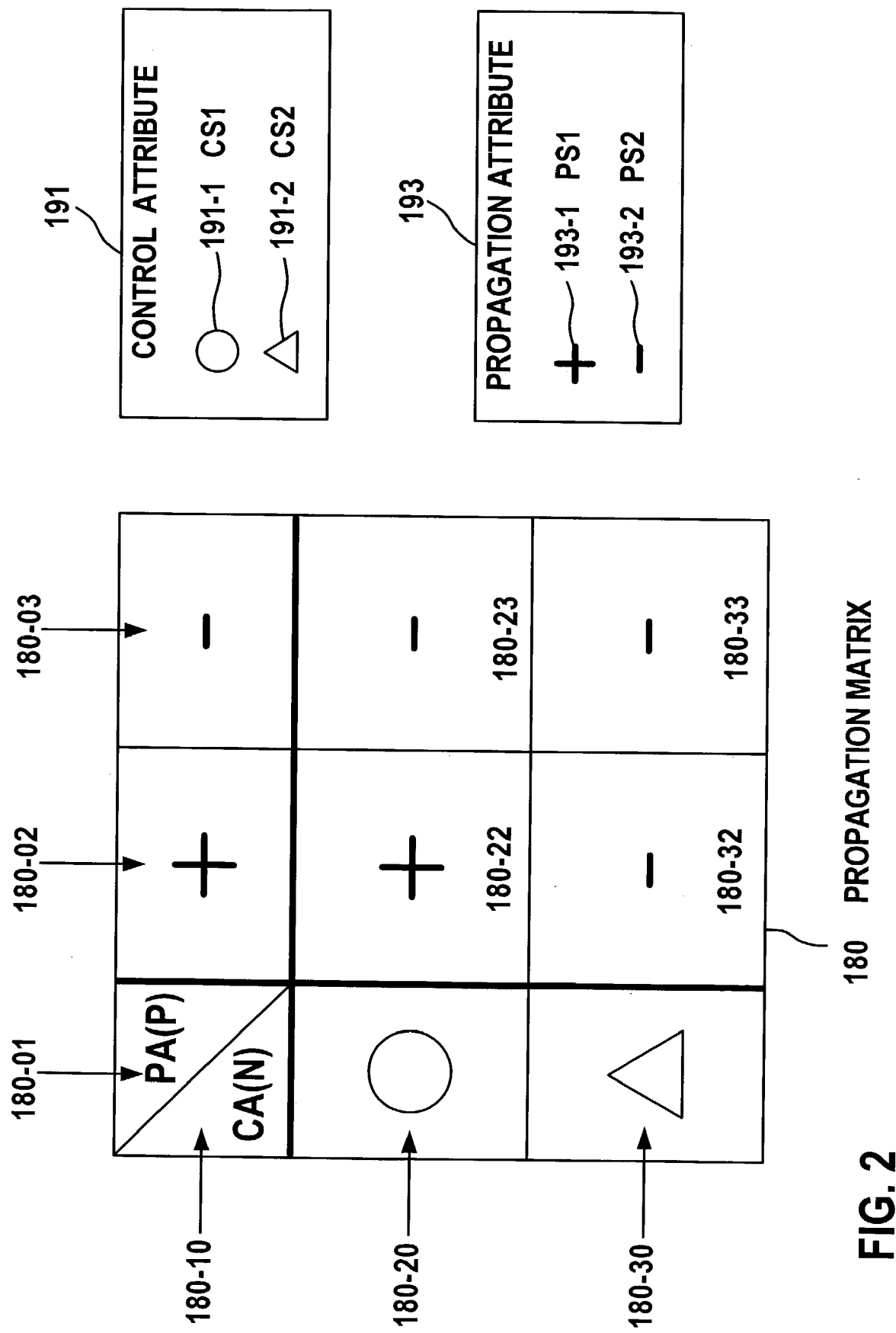
FIGS. 2, 3A, 3B illustrate examples of state matrices that define propagation and display rules.
Figure 3A:
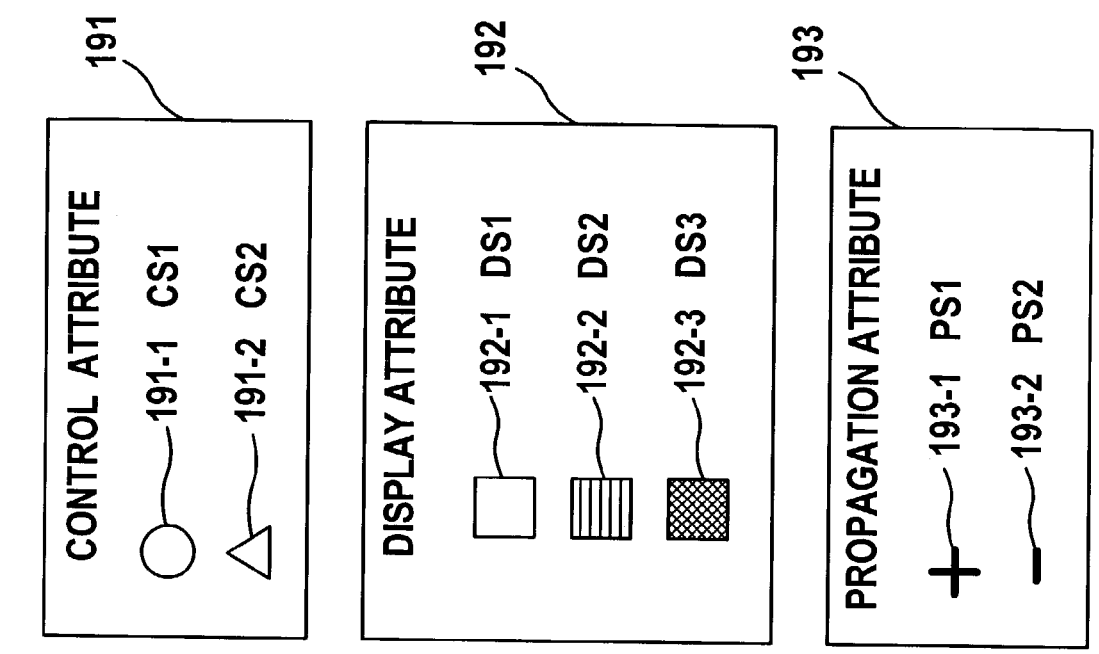
Figure 3A:
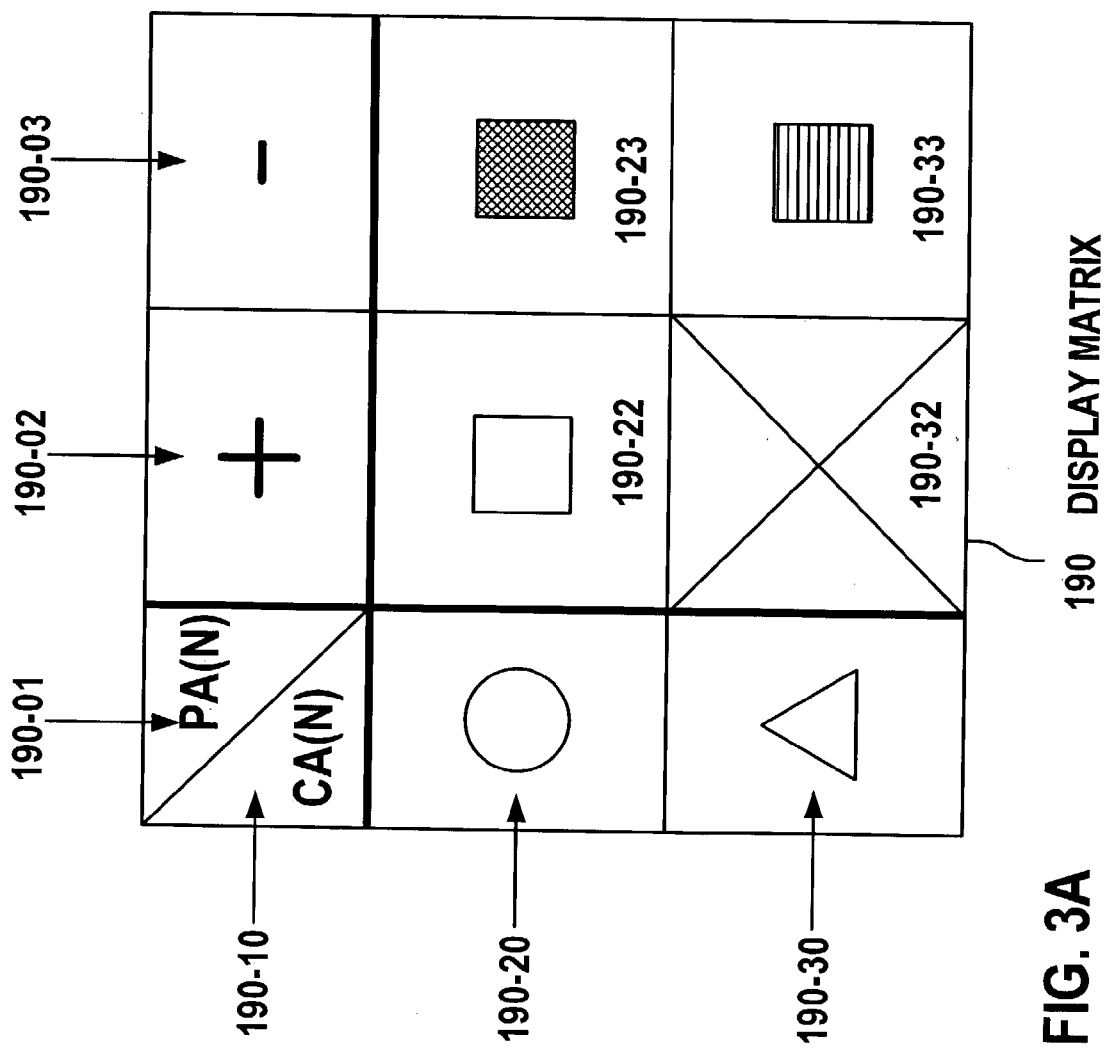
Figure 3B:
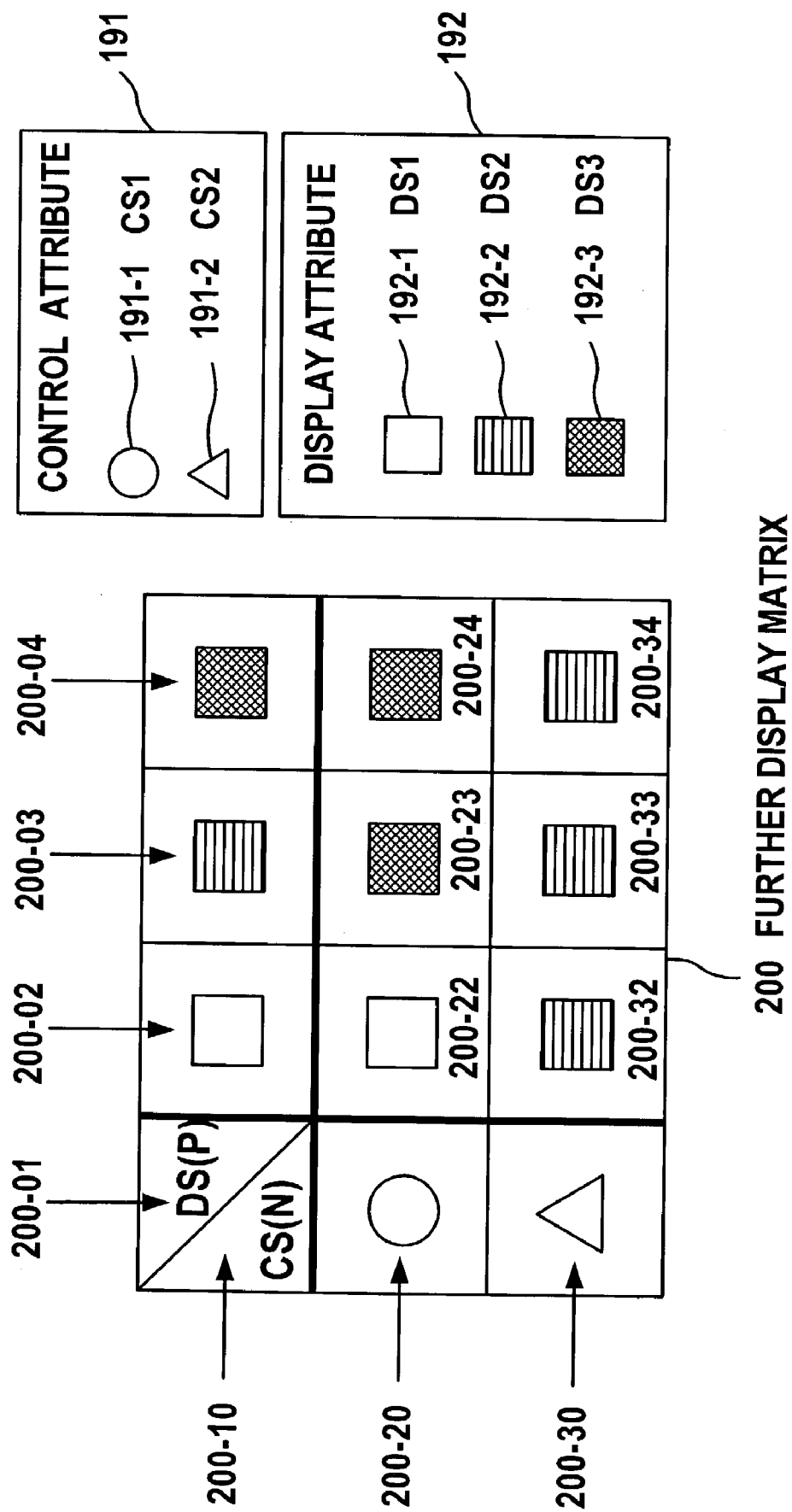

Nodes of tree 110 are illustrated as squares. The different patterns (white, bar, grid) symbolize a different visual appearance of the nodes on output device 950. According to the present invention, the visual appearance of a node depends on the node's display attribute. A display attribute of a node (DA) is an attribute that controls the visual appearance of the node in a tree. The display attribute can have multiple display states (e.g., DS1, DS2, DS3). FIGS. 2, 3A, 3B show example state matrices that define propagation rules and display rules. Cells of state matrices are referred to by reference numbers where the row index (e.g., 180-20) is combined with the column index (e.g., 180-02) to a cell index (e.g., 180-22, indicating the cell comprising PS1 in propagation matrix 180; cf. FIG. 2).

In FIG. 2, propagation matrix 180 defines propagation rules to set propagation attribute 193 of a node (e.g., 115, cf. FIG. 4) based on the propagation attribute 193 of the node's parent-node (PA(P), cf. row 180-10) and the control attribute 191 (CA(N), column 180-01) of the node. A propagation attribute of a node (PA) is a node attribute that forwards node properties of a node at a specific hierarchy level to the node's child-nodes at the next lower hierarchy level. For example, the propagation attribute can control the usage of a node by an application. The PA can have multiple propagation states (e.g., PS1, PS2). A control attribute of a node (CA) is a node attribute that has multiple control states (e.g., CS1, CS2). For example, the PA of a sub-node depends on the CA of all nodes in the path to the sub-node. A path is a unique identifier for a node (N) in a tree. The path includes identifiers of its parent-node (P), of the parent of the parent-node (P-1), and so on up to the root-node (R) of the tree (e.g., \R\P-3\P-2\P-1\P\S).

At any time, each attribute has one state from a set of predefined states. For convenience of explanation, FIGS. 2 to 5 illustrate states by graphical symbols.

In the example, CA(N) 191 has two control states 191-1, 191-2 (CS1, CS2). Different control states of control attribute 191 are illustrated by different shapes. CS1 corresponds to a circle and CS2 corresponds to a triangle. PA(P) 193 has two propagation states 193-1, 193-2 (PS1, PS2). Different propagation states of propagation attribute 193 are illustrated by different signs. PS1 corresponds to a plus (+) and PS2 corresponds to, a minus (−). Control attribute 191 can have more than two control states and propagation attribute 193 can have more than two propagation states.

In the example, propagation matrix 180 has rows 180-10, 180-20 and 180-30 and columns 180-01, 180-02 and 180-03. Row 180-10 refers to the propagation attribute 193 of the node's parent-node (e.g., 111) and comprises propagation state PS1 193-1 in column 180-02 and propagation state PS2 193-2 in column 180-03. Column 180-01 comprises control state CS1 191-1 of the node in row 180-20 and control state CS2 191-2 of the node in row 180-30. The further cells of propagation matrix 180 provide information about how the propagation attribute of the node PA(N) is set for each possible combination of the parent-node's propagation state and the node's control state.

The propagation rules that are defined by propagation matrix 180 for this example are now explained in detail referring to node 115 (cf. FIG. 4) as an example.

If node 115 has CA(N)=CS1 (180-21) and parent-node 111 has PA(P)=PS1 (180-12), that is, when the Boolean expression CA(N)=CS1 AND PA(P)=PS1 is true, the propagation attribute 193 of node 115 (PA(N)) is set to PS1 (180-22).

If node 115 has CA(N)=CS2 (180-31), PA(N) is set to PS2 (180-32, 180-33).

If parent-node 111 has PA(P)=PS2 (180-13), PA(N) is set to PS2 (180-23, 180-33).

In other words, in the example, PA(N) is PS1 only if all nodes in the path to node 115 have PS1 and node 115 has CS1. As a consequence, if CS1 and CS2 correspond to control states active and inactive, respectively, and PS1 and PS2 correspond to propagation states active and inactive, respectively, a node has the propagation state active when its control state is active and all nodes on its path have the propagation state active. Further propagation rules can be implemented to achieve further effects.

According to propagation matrix 180, the propagation attribute 193 of a node 180 depends on the propagation attribute of its parent-node. Therefore, propagation matrix 180 is not applicable to root-node 111 of tree 110. In one advantageous implementation, for root-node 111 of tree 110 the following propagation rules are used:

if root-node 111 has control state CS1, the propagation attribute 193 of root-node 111 is set to PS1; and if root-node 111 has control state CS2, the propagation attribute 193 of root-node 111 is set to PS2.

FIG. 3A shows a display matrix 190 that defines display rules to set display attribute 192 of a node DA(N) (e.g., 115, cf. FIG. 4) in dependence of the propagation attribute 193 (PA(N), cf. row 190-10) and the control attribute 191 (CA(N), column 190-01) of the node.

In the example, display attribute 192 has three display states 192-1, 192-2, 192-3 (DS1, DS2, DS3). Different display states of display attribute 192 are illustrated by different fill patterns. DS1 has a white pattern, DS2 has a bar pattern and DS3 has a grid pattern. The display attribute 192 can have more than three display states.

In the example, display matrix 190 has rows 190-10, 190-20 and 190-30 and columns 190-01, 190-02 and 190-03. Row 190-10 comprises propagation state PS1 in column 190-02 and propagation state PS2 in column 190-03 of a node (e.g., 115) of tree 110 (cf. FIG. 4). Column 190-01 comprises control state CS1 in row 190-20 and control state CS2 row 190-30 of the node (e.g., 115). The further cells of display matrix 190 provide information about the display attribute of the node DA(N) in dependence of the node's control attribute 191 CA(N) and propagation attribute 193 PA(N). The display rules that are defined by display matrix 190 for this example are now explained in detail referring to node 115 (cf. FIG. 4) as an example.

If node 115 has propagation state PA(N)=PS1 (190-12) AND control state CA(N)=CS1 (190-21), the display state of node 115 is set to DA(N)=DS1 (190-22).

If node 115 has propagation state PA(N)=PS2 (190-13) AND control state CA(N)=CS1 (190-21), the display state of node 115 is set to DA(N)=DS3 (190-23).

If node 115 has propagation state PA(N)=PS2 (190-13) and control state CA(N)=CS2 (190-31), the display state of node 115 is set to DA(N)=DS2 (190-33).

Cell 190-32 is crossed out because, in the example, according to row 180-30 of propagation matrix 180, a node having CS2 and PS1 is not allowed.

An advantage of this preferred embodiment of display matrix 190 is that the visualization of a node's display state allows the user to derive the control state and the propagation state of the node. For convenience of explanation, control states CS1 and CS2 stand for active and inactive, respectively. Propagation states PS1 and PS2 stand for active and inactive, respectively, and display states DS1, DS2 and DS3 stand for active, inactive and implicitly inactive, respectively.

In other words the content of display matrix 190 in the example can be described as follows (by using the previous definitions):

If node 115 has control state inactive, it always has display state inactive.

If node 115 has control state active, it has display state active if it has propagation state active (no inactive nodes in the node path).

If node 115 has control state active and propagation state inactive, it has display state implicitly inactive. This is the case when an active node belongs to an inactive sub-tree. A sub-tree is inactive when at least one node in the path of the root-node of the sub-tree is inactive.

FIG. 3B shows a further display matrix 200 that defines alternative display rules to set display attribute 192 of a node (e.g., 115) in dependence of the control attribute 191 (CA (N), column 200-01) of the node and the display attribute 192 (DA(P), row 200-10) of the node's parent-node (e.g., 111). In this embodiment the propagation attribute 193 is not relevant. The display attribute 192 DA(P) of the parent-node fulfils a propagation function.

As in FIG. 3A, in this example, display attribute 192 has three display states 192-1, 192-2, 192-3 (DS1, DS2, DS3).

In this example, further display matrix 200 has rows 200-10, 200-20 and 200-30 and columns 200-01, 200-02, 200-03 and 200-04. Row 200-10 has display states of the parent-node (e.g., 111) (DS1 in column 200-02, DS2 in column 200-03 and DS3 in column 200-03). Column 200-01 has control states of the node (e.g., 115) (CS1 in row 200-20 and CS2 in row 200-30). The further cells of display matrix 200 provide information about the display state of the node in dependence of its control attribute 191 CA(N) and the display attribute 192 DA(P) of the parent-node. The display rules that are defined by display matrix 200 for this example are now explained in detail referring to node 115 as an example.

If node 115 has control state CA(N)=CS1 (200-21) AND its parent-node 111 has display state DA(P)=DS1, the display state of node 115 is set to DA(N)=DS1 (200-22).

If node 115 has control state CA(N)=CS1 (200-21) AND its parent-node 111 has display state (DA(P)=DS2 (200-03) OR DA(P)=DS3 (200-04)), the display state of node 115 is set to DA(N)=DS3 (200-23, 200-24).

Otherwise, the display state of node 115 is set to DA(N)=DS2 (200-32, 200-33, 200-34).

An advantage of this preferred embodiment of display matrix 200 is that the display attribute of a node always allows the user (by looking at the graphical representation of the node's display state) to derive the corresponding control state of the node as well as a virtual propagation state of the node. For convenience of explanation, control states CS1 and CS2 stand for active and inactive, respectively. Display states DS1, DS2 and DS3 stand for active, inactive and implicitly inactive, respectively. The virtual propagation state of the node is inactive when the display state is inactive or implicitly inactive and it is active when the display state is active.

In other words, when the control attribute of a node is changed, the display rules defined by further display matrix 200 lead to the same display attribute adjustments as the display rules defined by the combination of propagation matrix 180 and display matrix 190. The user experiences the same advantages as with the embodiment described in reference to FIGS. 2, 3A.

According to further display matrix 200 display attribute 192 of a node 180 depends on the display attribute of its parent-node. Therefore, further display matrix 200 is not applicable to root-node 111 of tree 110. In one advantageous implementation, for root-node 111 the following display rules are used:

if root-node 111 has control state CS1, the display attribute 192 of root-node 111 is set to DS1; and if root-node 111 has control state CS2, the display attribute 192 of root-node 111 is set to DS2.

Figure 4B:
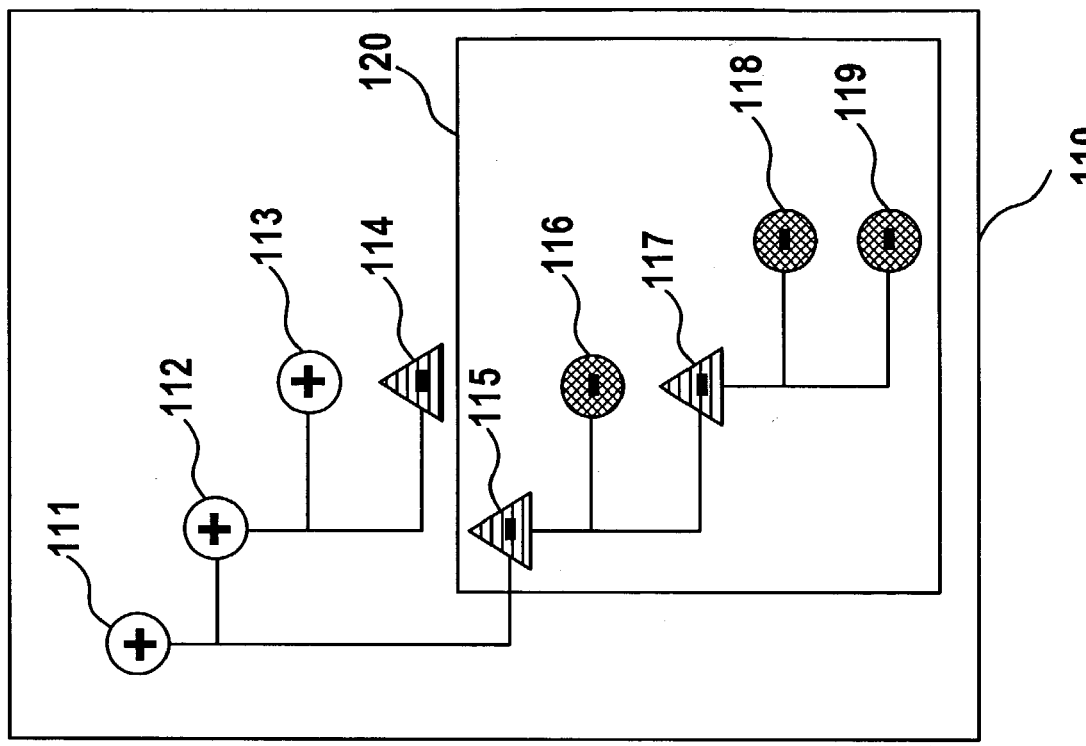
FIGS. 4A–C illustrates three consecutive time points of the computer system, when operated according to the present invention.
Figure 4A:
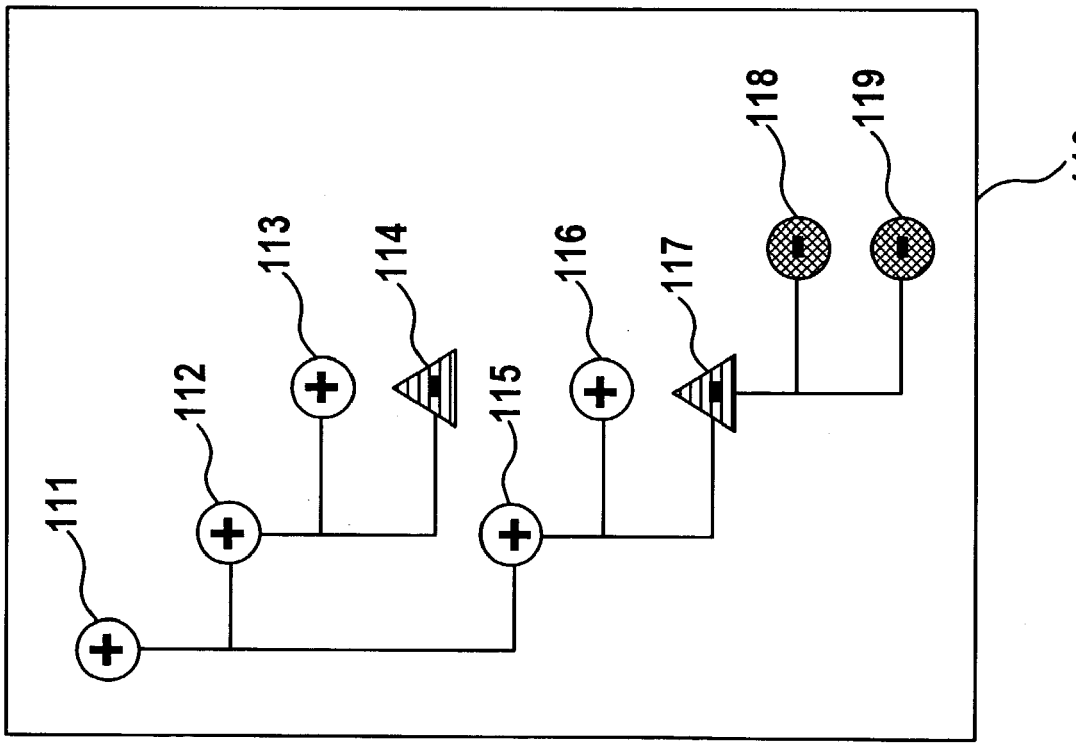
Figure 4C:
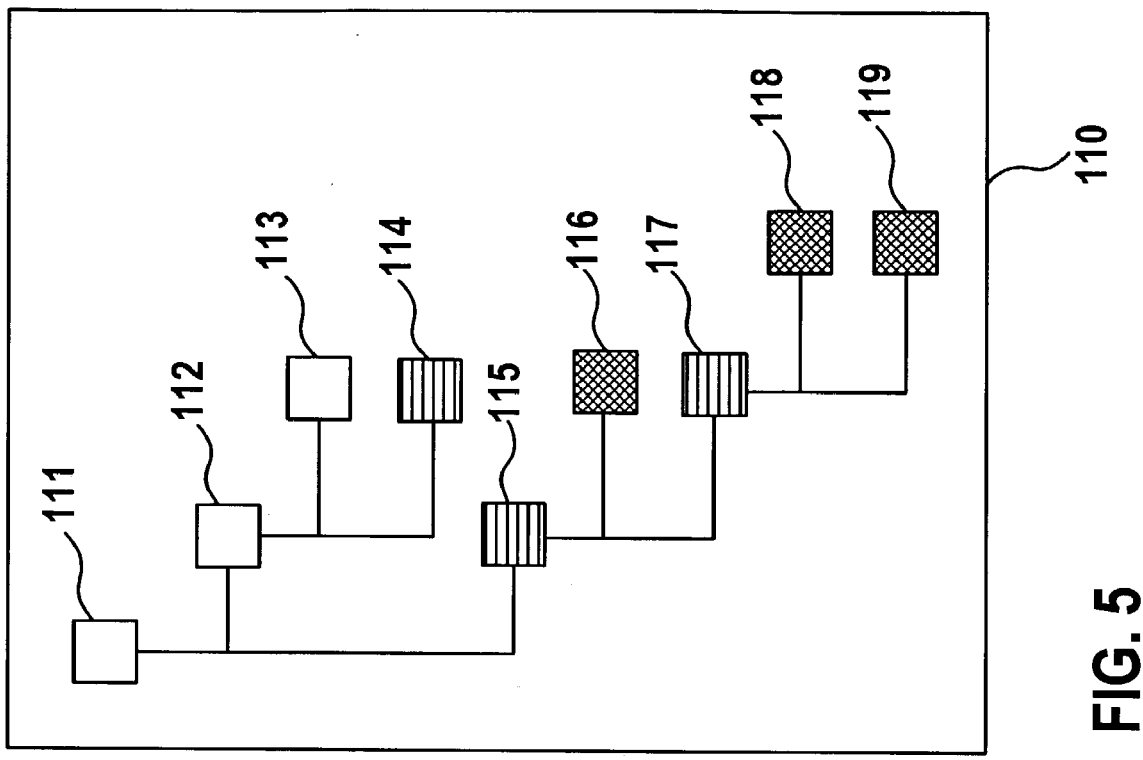

FIG. 4 illustrates tree 110 at three consecutive time points T1, T2, T3 (FIG. 4A, FIG. 4B, FIG. 4C), when a computer system is operated according to the present invention.

FIG. 4A illustrates an example of predefined tree 110 at T1. Nodes 111, 112, 113, 115, 116, 118, 119 have CS1 (circle). Nodes 114, 117 have CS2 (triangle). Nodes 111, 112, 113, 115, 116 have PS1 (+). Nodes 114, 117, 118, 119 have PS2 (−). Nodes 111, 112, 113, 115, 116 have DS1

(white pattern). Nodes 114, 117 have DS2 (bar pattern) and nodes 118, 119 have DS3 (grid pattern). The states are in compliance with the propagation and display rules of propagation matrix 180 and display matrix 190 (cf. FIGS. 2, 3A) as well as with the alternative display rules of further display matrix 200 (cf. FIG. 3B).

FIG. 4B illustrates tree 110 at T2, where control attribute 191 of node 115 is changed from CS1 (circle) to CS2 (triangle). Node 115 is the root-node of sub-tree 120. According to propagation rule 180-32 the propagation state of node 115 changes from PS1 (+) to PS2 (−). According to propagation rule 180-23 the propagation state of node 116 changes from PS1 (+) to PS2 (−). According to propagation rules 180-23 and 180-33, the propagation states of nodes 117, 118, 119 remain unchanged (PS2). In the example, by changing the control attribute 191 of root-node 115 to CS2 (inactive) the propagation attribute 193 of all further nodes in sub-tree 120 is set to PS2 (inactive). This illustrates that the propagation rules are defined to deactivate a whole sub-tree when its root-node gets deactivated. In this example, none of the nodes of sub-tree 120 can be executed any more by a corresponding application, although some of the nodes (116, 118, 119) still have control attribute CS1 (active). Other rule sets can be chosen to achieve other effects.

In this example, each node in tree 110 stands for an URL (unique resource locator). PS1/PS2 indicate that user access to the corresponding URL is allowed (+)/denied (−). By setting control attribute 191 of node 115 to CS2 (inactive), user access to all nodes of sub-tree 120 is disabled by the propagation attribute 193. However, control attribute 191 of nodes 116, 118, 119 is still CS1 (active). Therefore, according to display matrix 190 (cf. FIGS. 2, 3A, 3B), a computer system (e.g., a computer system that includes computers 900 and 901 (FIG. 1)) sets display attribute 192 of nodes 116, 118, 119 to DS3 (implicitly inactive). In one implementation, the propagation attribute of root-node 115 at the first hierarchy level of sub-tree 120 is propagated to sub-nodes 116, 117 at the second hierarchy level of sub-tree 120. Then, propagation attribute of sub-node 117 is propagated to sub-nodes 118, 119 at the third hierarchy level of sub-tree 120.

The display states of nodes 115–119 of tree 110 at T2 can also be explained by using further display matrix 200 (cf. FIG. 3B). In this case the propagation attribute (+, −) is not relevant (only virtual). Propagation occurs through the display rules that depend on the display status of the parent-node. Display attribute 192 of node 115 is set to DS2 according to display rule 200-32. Display attribute 192 of node 116 is set to DS3 according to display rule 200-23. The display attribute 192 of nodes 117–119 remains unchanged according to display rules 200-33 (for 117) and 200-23 (for 118, 119).

FIG. 4C illustrates tree 110 at T3 and shows how the user can use the present invention as a tree-"preview function" to predict in advance the states of the nodes of tree 110 after the change of the control attribute 191 of a node. Control attribute 191 of node 117 is changed from CS2 (triangle) to CS1 (circle). According to propagation rule 180-23 the propagation attribute 193 of node 117 remains PS2 (−). At T3 all nodes of sub-tree 120 have propagation attribute PS2 (−, inactive) but only the root-node 115 of sub-tree 120 has control attribute CS2 (triangle, inactive). According to display rule 190-23, the display attribute 192 is set to DS3 (bar, implicitly inactive) for nodes 116-119. The user now recognizes that, when changing the control attribute 191 of root-node 115 from CS2 (triangle, inactive) to CS1 (circle, active), sub-tree 120 would be completely reactivated, because its sub-nodes were implicitly inactive (induced inactivity through the propagation state PS2 inherited from node 115). Therefore, the example shows how the user can prepare sub-tree 120 for reactivation through a single control attribute change of node 115, while still keeping the sub-tree 120 inactive. This is an advantage over prior art systems, where the reactivation has to be done manually node by node while the sub-tree 120 is active (that is, the root-node of sub-tree 120 is active). Moreover, further sub-trees within a sub-tree can be permanently deactivated by appropriate propagation rules by setting the control state of the corresponding root-node to CS2 (inactive).

The display states of nodes 117–119 in the third state of tree 110 can also be explained by using further display matrix 200. Display attribute 192 of node 117 is set to DS3 (bar) according to display rule 200-23. The display attribute 192 of nodes 118, 119 remains unchanged (DS3) according to display rule 200-24.

Figure 5:
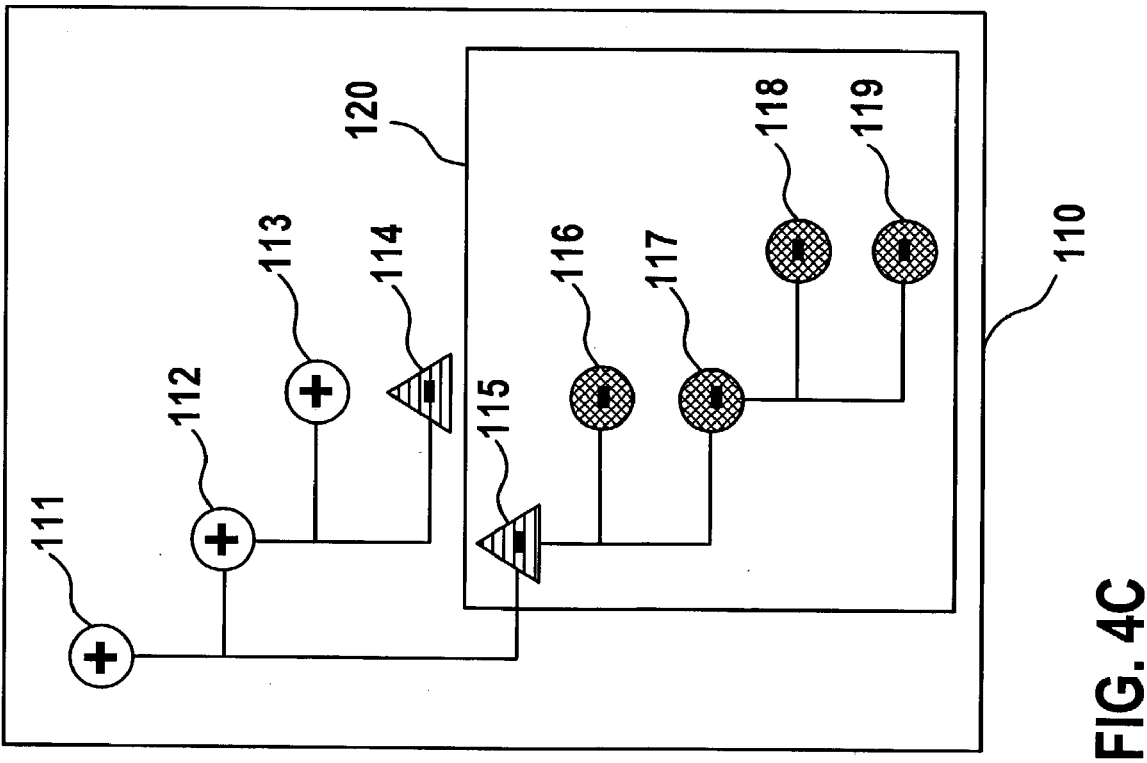
FIG. 5 illustrates an example of an inventive screen view that displays a tree.

FIG. 5 illustrates an example screen view of a display device 950 that displays tree 110 according to the present invention.

The screen view refers to time point T2 described under FIG. 4B. Having a corresponding graphical representation of control attribute (shape), display attribute (fill pattern) and propagation attribute (sign) might be inconvenient or confusing for the user.

Therefore, FIG. 5 illustrates a visualization of tree 110, wherein the graphical representations of the control attribute 191 or propagation attribute 193 are not shown the display device 950 (cf. FIG. 1). In the example, the nodes of tree 110 only show the graphical representation of display attribute 192. For the user the full information is still available because the computer system implicitly indicates control attribute 191 and propagation attribute 193 (or a virtual propagation attribute) by display attribute 192 according to the rules of display matrix 180, propagation matrix 190 or further display matrix 200.

Figure 6A:
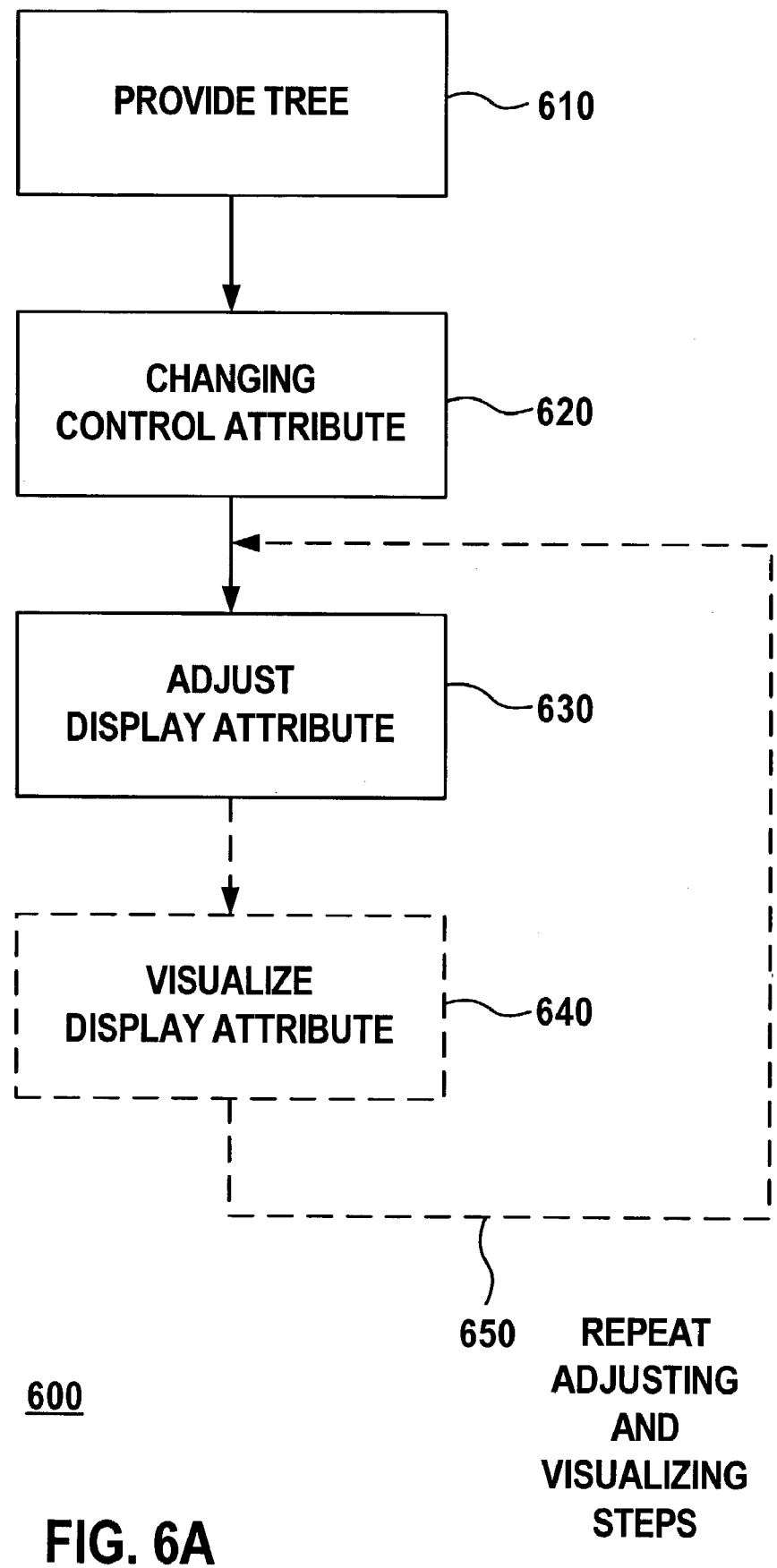
FIGS. 6A–B illustrate simplified flow charts of the inventive method.

FIG. 6A illustrates details of a method 600 for adjusting display states of tree-nodes. Method 600 includes the steps: providing tree (step 610), changing control attribute (step 620) and adjusting display attribute (step 630). Optionally, method 600 further includes the steps visualizing display attribute (step 640) and repeating adjusting and visualizing steps(step 650). The steps are now explained in detail.

In providing a tree (step 610), a computer system provides predefined hierarchy data that in one implementation are visualized as predefined tree 110 on display device 950 of client computer 900 (cf. FIG. 1). Tree 110 has a plurality of nodes 111–119, wherein each node has a predefined control attribute 191 and a predefined display attribute 192. For example control attribute 191 has control state CS1 or CS2 (cf. FIGS. 2, 3A, 3B) and display attribute 192 has display state DS1, DS2 or DS3 (cf. FIGS. 2, 3A, 3B).

In changing a control attribute (step 620), the computer system changes control attribute 191 of a node 115. For example control attribute 191 changes from control state CS1 (cf. FIG. 4A) to control state CS2 (cf. FIG. 4B). In the example, node 115 defines sub-tree 120 (cf. FIG. 4B) of tree 110 and is the root-node of sub-tree 120.

In the example, node 115 has parent-node 111. In adjusting a display attribute (step 630), the computer system adjusts 630 display attribute 192 of node 115 with respect to control attribute 191 of node 115 and display attribute 192 of parent-node 111. The adjustment of display attribute 192 of node 115 is performed in accordance with predefined display rules. In one implementation, the predefined display rules are embodied in display matrix 200 (cf. FIG. 3B). For example, display matrix 200 can be stored as a table in a memory of a computer of the computer system. Alternative embodiments of the display rules are also possible, such as a description of the rules by using program code.

In visualizing a display attribute (optional step 640), the computer system uses a user interface to visualize a specific graphical representation of display attribute 192 of node 115. It is not important for the invention which type of graphical representation is used for display attribute 192. Some examples for different types of graphical representations of display attribute 192 are listed below:

a) node shape (e.g., DS1/circle, DS2/triangle, DS3/square);

b) node color (e.g., DS1/green, DS2/red, DS3/yellow);

c) node fill-pattern (e.g., DS1/white, DS2/bar, DS3/grid; cf. FIG. 3B);

d) node animation (e.g., DS1/permanent, DS2/scrolling, DS3/blinking).

Other types are possible. In one advantageous implementation, the user can choose the type that is most convenient to him or her.

In the example, node 115 defines sub-tree 120 (cf. FIG. 4B) of tree 110. 3. In repeating the adjusting and visualizing (optional step 650), the computer system repeats the adjusting 630 and visualizing 640 steps for each sub-node 116–119 of sub-tree 120.

Figure 6B:
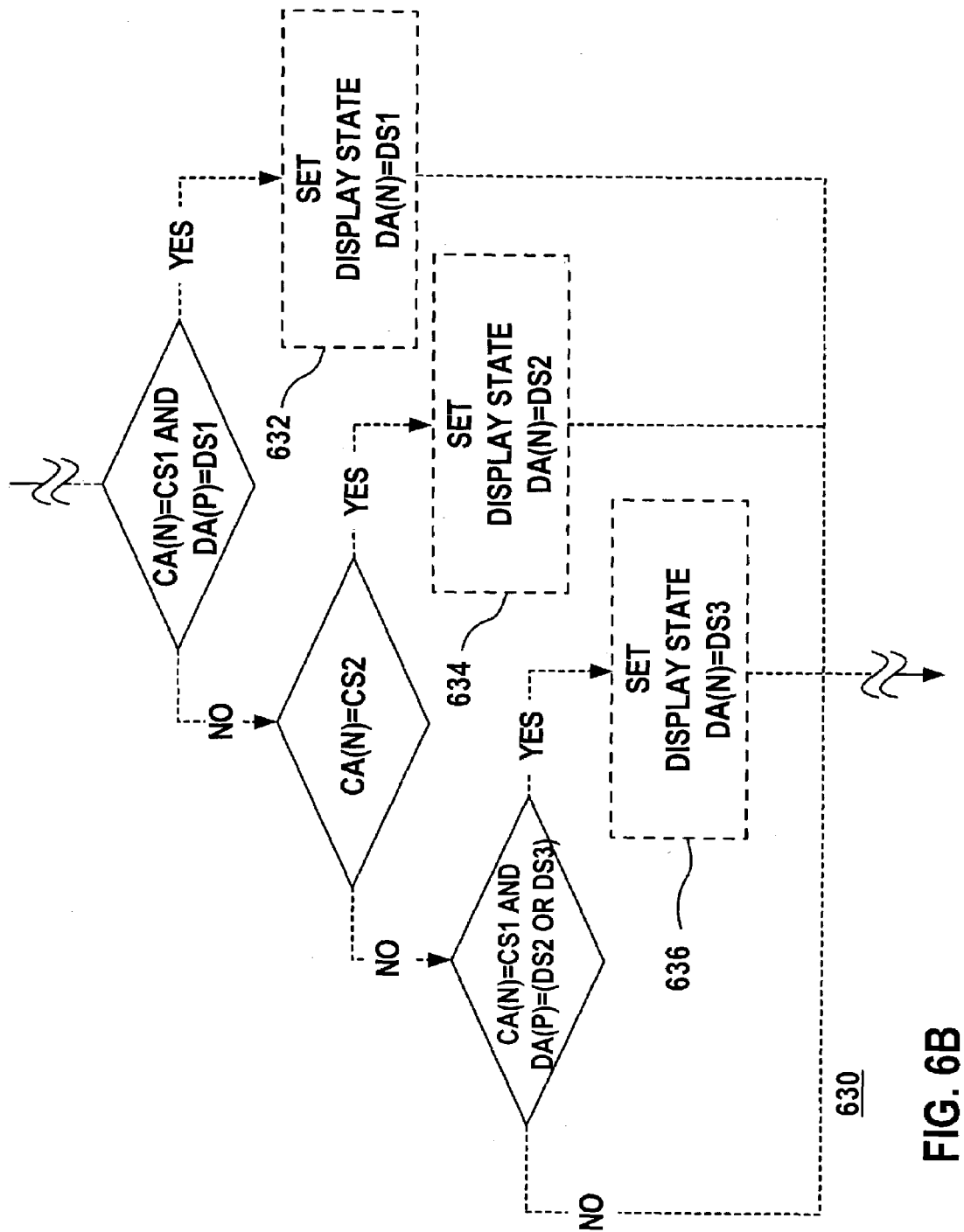

FIG. 6B illustrates optional steps 632, 634, 636 of the adjusting display attribute step (step 630) to set display attribute 192 of node 115 in accordance with the display rules of display matrix 200. For convenience of explanation, the optional steps are shown in a flow chart diagram. However, the order in which the steps are executed is not important for the invention. The optional steps are now explained in detail. According to this implementation, the computer system:

a) sets 632 display attribute 192 of node 115 to first display state 192-1, if control attribute 191 of node 115 has first control state 191-1 AND display attribute 192 of parent-node 111 has first display state 192-1 (rule 200-22);

b) sets 634 display attribute 192 of node 115 to second display state 192-2, if control attribute 191 of node 115 has second control state 191-1 (rules 200-32, 200-33, 200-34); and c) sets 636 display attribute 192 of node 115 to third display state 192-3, if control attribute 191 of node 115 has first control state 191-1 AND (display attribute 192 of parent-node 111 has second display state 192-2 (rule 200-23) OR third display state 192-3 (rule 200-24)), that is, when the Boolean expression CA(N)=CS1 AND (DA(P)=DS2 OR DA(P)=DS3) is true.

As explained in the example of FIGS. 2, 3A, 3B, control states CS1 191-1 and CS2 191-2 can stand for active and inactive, respectively. Display states DS1 192-1, DS2 192-2 and DS3 192-2 can stand for active, inactive and implicitly inactive, respectively.

Figure 7B:
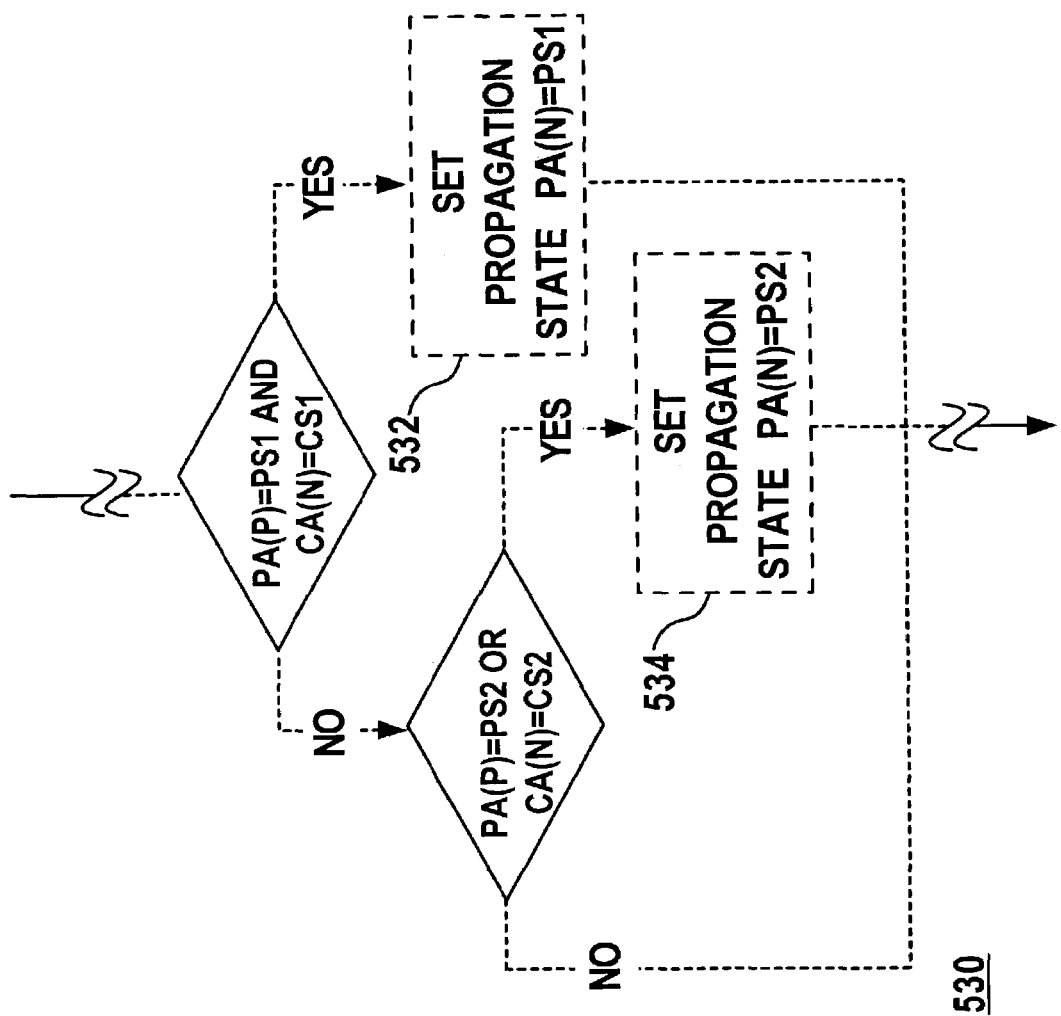
Figure 7A:
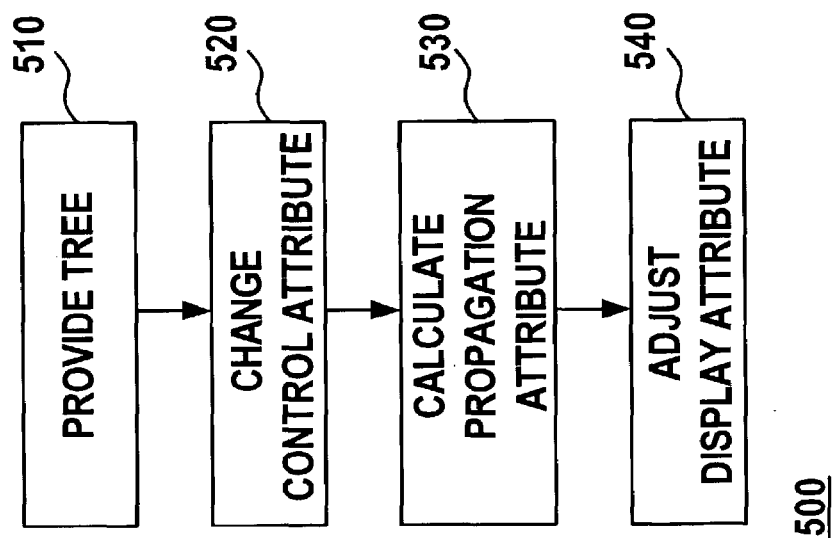

FIG. 7A illustrates a method 500 for adjusting display states of tree-nodes that uses the propagation attribute 193. Method 500 includes the steps: providing tree 510, changing control attribute 520, calculating propagation attribute 530 and adjusting display attribute 540. The steps are now explained in detail.

The providing tree 510 step of method 500 is equivalent to the providing tree 410 step of method 400, described below.

In the changing control attribute 520 step, a computer system changes control attribute 191 of node 115. The request to change the control attribute can come from the user using a user interface of computer 900. Alternatively, the request can be launched by any other computer (e.g., 901) of the computer system. Node 115 can define sub-tree 120 of tree 110.

In the calculating propagation attribute 530 step, the computer system calculates propagation attribute 193 for each node 115–119 of sub-tree 120 according to predefined propagation rules 180. The propagation rules can be implemented in propagation matrix 180 (cf. FIG. 2) in the form of a table or program code. It is not important for the invention where the propagation rules are stored. They can be stored in the memory of any of the computers of the computer system.

In the adjusting the display attribute 540 step, the computer system adjusts display attribute 192 of each node 115–119 of sub-tree with respect to the nodes' control attributes 191 and propagation attributes 193 according to predefined display rules 190. The display rules can be implemented in display matrix 190 (cf. FIG. 3A) in the form of a table or program code. It is not important for the invention where the display rules are stored. They can be stored in the memory of any of the computers of the computer system.

In a preferred embodiment of the invention, propagation rules 180 and display rules 190 complement each other in such a way that display attribute 192 of a node allows the user to clearly distinguish nodes with respect to their control attribute 191 and propagation attribute 193. Therefore, it is sufficient for the computer system to visualize the display attribute 192 to indicate to the user how the tree behaves, when the control attribute of any of the nodes 111–119 is changed.

FIG. 7B illustrates optional steps 532, 534 of calculating propagation attribute 530 step to set propagation attribute 193 of node 115 in accordance with the propagation rules of propagation matrix 180. Each node 115–119 of sub-tree 120 has a parent-node. For convenience of explanation the optional steps are shown in a flow chart diagram. However, the order in which the steps are executed is not important for the invention. The optional steps are now explained in detail. In one implementation, the computer system for each node 115–119 of sub-tree 120:

sets 532 propagation attribute 193 of node 115 to first propagation state 193-1, if control attribute 191 of node 115 has first control state 191-1 AND propagation attribute 193 of parent-node 111 has first propagation state 193-1; and sets 534 propagation attribute 193 of node 115 to second propagation state 193-2, if control attribute 191 of the node 115 has second control state 191-2 OR if propagation attribute 193 of parent-node 111 has second propagation state 193-2.

As a consequence, in the example the propagation attribute 193 of a node has first propagation state 193-1 (e.g., active) only, if all nodes on the path to the node have first control state 191-1 (e.g., active). Other combinations lead to second propagation state 193-2 (e.g., inactive).

FIG. 7C illustrates optional steps 542, 544, 546 of adjusting display attribute 540 step to set display attribute 192 of node 115 in accordance with the display rules of display matrix 190. For convenience of explanation the optional steps are shown in a flow chart diagram. However, the order in which the steps are executed is not important for the invention. The optional steps are now explained in detail. In one implementation, the computer system repeats for each node 115–119 of sub-tree 120:

setting 542 display attribute 192 of the node to first display state 192-1, if control attribute 191 of node has first control state 191-1 AND propagation attribute 193 of the node has first propagation state 193-1;

setting 544 display attribute 192 of the node to second display state 192-2, if control attribute 191 of the node has second control state 191-2 AND propagation attribute 193 of the node 115 has second propagation state 193-2; and setting 546 display attribute 192 of the node to third display state 192-3, if control attribute 191 of the node 115 has first control state 191-1 AND propagation attribute 193 of the node 115 has second propagation state 193-2.

For example, first display state 192-1 (e.g., active) indicates first control state 191-1 (e.g., active) and first propagation state 193-1 (e.g., active). Second display state 192-2 (e.g., inactive) indicates second control state 191-2 (e.g., inactive) and second propagation state 193-2 (e.g., inactive). Third display state 192-2 (e.g., implicitly inactive) indicates first control state 191-1 (e.g., active) and second propagation stat 193-2 (e.g., inactive).

Figure 8:
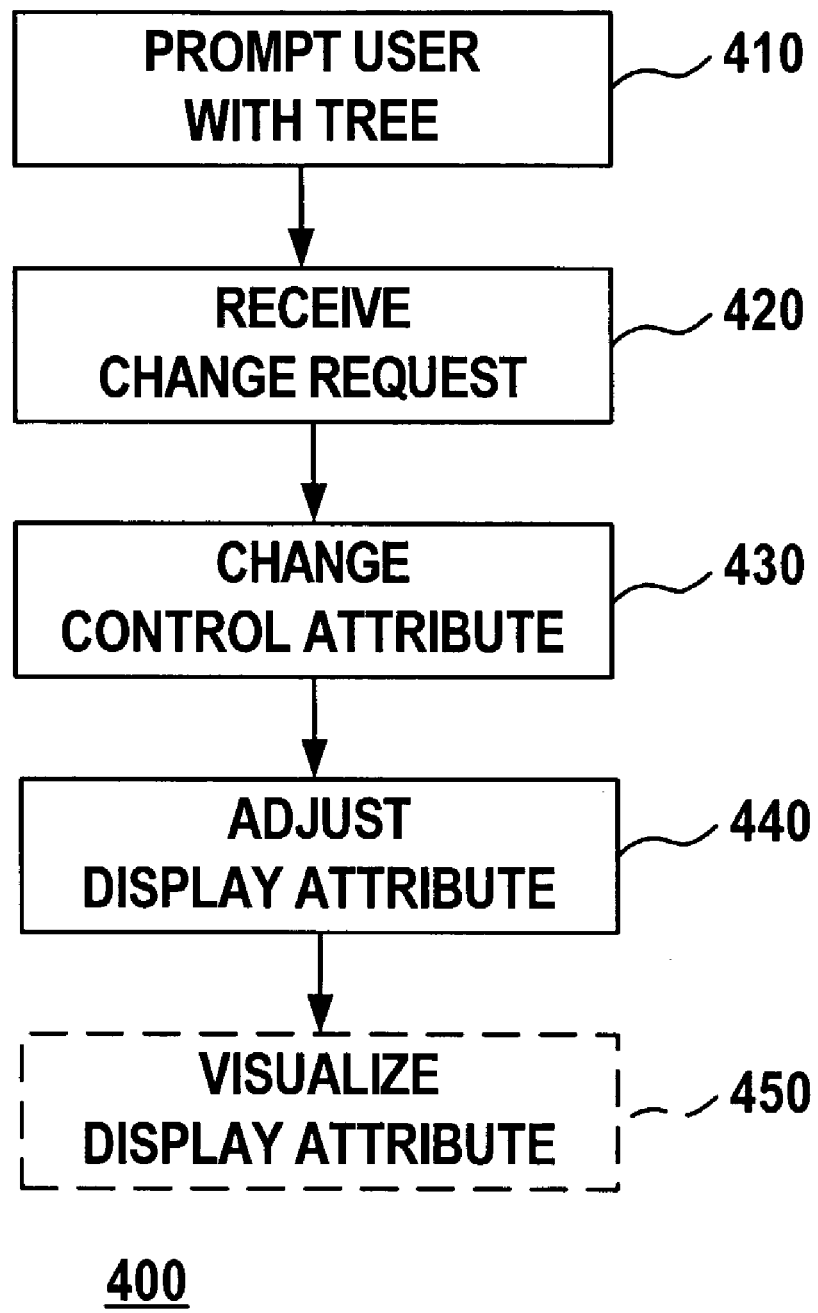
FIG. 8 is a simplified flow charts of a still further method according to the present invention.

FIG. 8 illustrates a simplified flow chart of a method 400 for adjusting display states of tree-nodes. Method 400 describes the interaction of the user with the computer system, which is operated according to method 600.

Method 400 includes the steps: prompting user with tree 410, receiving change request 420, changing control attribute 430 and adjusting display attribute 440. Optionally, method 400 further includes the step visualizing display attribute 450. The steps are now explained in detail.

In the prompting user with tree 410 step, a computer system displays predefined tree 110 to the user through a user interface. Tree 110 is provided as described in the providing step 610 of method 600 (cf. FIG. 6).

In the receiving change request 420 step, the computer system receives a request from the user to change control attribute 191 of node 115. The user launches the request through a user interface. Node 115 defines sub-tree 120 of tree 110.

In the changing control attribute 430 step, the computer system changes control attribute 191 of node 115 according to the request of the user as described in changing step 620 of method 600.

In the adjusting display attribute 440 step, the computer system adjusts display attribute 192 of each node 115–119 of sub-tree 120 with respect to control attribute 191 of each node 115–119 and display attribute 192 of each node's 115–119 parent-node according to predefined display rules 200.

In the optional visualizing 450 step, the computer system visualizes display attribute 192 of each node 111–119 of tree 110.

Steps 430 to 450 are equivalent to steps 620 to 650 of method 400 and provide the same advantages to the user as described under FIG. 6.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method comprising:

providing a tree, the tree having a plurality of nodes, wherein each node has a control attribute and a display attribute, the control attribute being a node attribute that has at any time one control state, the control state being one of a plurality of predefined control states, the display attribute being a node attribute that controls the visual appearance of the node in the tree and that has at any time one display state, the display state being one of a plurality of predefined display states;

changing the control attribute of a node having a parent-node; then setting the display attribute of the node to a display state determined by the control state of the control attribute of the node and the display state of the display attribute of the parent-node according to predefined display rules; and displaying the node, the visual appearance of the node being controlled by the display attribute of the node.

2. The method of claim 1, further comprising:
the display attribute of the node visible.

3. The method of claim 2, wherein the node defines a sub-tree of the tree, the method further comprising:
setting the display attribute and making the display attribute visible for each sub-node of the sub-tree.

4. The method of claim 3, wherein changing the control attribute changes the control attribute of the node to inactive and setting the display attribute of each sub-node indicates deactivation of the sub-tree by setting the display attribute of each node of the sub-tree to inactive or implicitly inactive.

5. The method of claim 3, wherein changing the control attribute changes the control attribute of the node to active and setting the display attribute of each sub-node indicates reactivation of the sub-tree by setting to display attribute of each node of the sub-tree to active, inactive or implicitly inactive.

6. The method of claim 2, wherein the display attribute comprises a node shape, node color, node pattern, or node animation.

7. The method of claim 1, wherein setting the display attribute comprises:
setting the display attribute of the node to a first display state if the control attribute of the node has a first control state and the display attribute of the parent-node has the first display state;
setting the display attribute of the node to a second display state if the control attribute of the node has a second control state; and
otherwise, setting the display attribute of the node to a third display state.

8. The method of claim 1, wherein the plurality of predefined control states is active and inactive.

9. The method of claim 1, wherein the plurality of predefined display states is active, inactive and implicitly inactive.

10. The method of claim 1, further comprising:
prompting a user with the tree; and
changing the control attribute of the node in response to a request received from the user to change the control attribute of the node.

11. The method of claim 1, further comprising:
making the display attribute of each node of the predefined tree visible.

12. A computer-implemented method comprising:
providing a tree, the tree having a plurality of nodes, wherein each node has a propagation attribute, a control attribute and a display attribute, the propagation attribute being a node attribute that defines how node properties of a node at a specific hierarchy level are forwarded to child nodes at the next lower hierarchy level and that has at any time one propagation state, the propagation state being one of a plurality of predefined propagation states, the control attribute being a node attribute that has at any time one control state, the control state being one of a plurality of predefined control states, the display attribute being a node attribute that controls the visual appearance of the node in the tree and has at any time one display state, the display state being one of a plurality of predefined display states;

changing the control attribute of a node, wherein the node defines a sub-tree of the tree; each node of the sub-tree having a parent-node; then setting the propagation attribute of each node of the sub-tree to a propagation stated determined by the control state of the control attribute of the node and the propagation state of the propagation attribute of the corresponding parent-node according to predefined propagation rules; then setting the display attribute of each node of the sub-tree to a display state determined by the control state of the control attribute of the node and the propagation state of the propagation attribute of the node according to predefined display rules; and displaying the node, the visual appearance of the node being controlled by the display attribute of the node.

13. The method of claim 12, wherein setting the propagation attribute comprises:
setting the propagation attribute of the node to a first propagation state if the control attribute of the node has a first control state and the propagation attribute of the node's parent-node has the first propagation state; and
otherwise, setting the propagation attribute of the node to a second propagation state.

14. The method of claim 13, wherein setting the display attribute for each node of the sub-tree comprises:
setting the display attribute of the node to a first display state if the control attribute of the node has the first control state and the propagation attribute of the node has the first propagation state;
setting the display attribute of the node to a second display state if the control attribute of the node has the second control state and the propagation attribute of the node has the second propagation state; and
setting the display attribute of the node to a third display state if the control attribute of the node has the first control state and the propagation attribute of the node has the second propagation state.

15. The method of claim 12, wherein the control attribute of a node has a control state from the group of active and inactive.

16. The method of claim 12, wherein the propagation attribute of a node has a propagation state from the group of active and inactive.

17. The method of claim 12, wherein the display attribute of a node has a display state from the group of active, inactive and implicitly inactive.

18. A computer program product, tangibly embodied in an information carrier, the computer program product having a plurality of instructions operable to cause data processing apparatus to perform the steps of:
providing a tree, the tree having a plurality of nodes, wherein each node has a predefined control attribute and a predefined display attribute, the control attribute being a node attribute that has at any time one control state, the control state being one of a plurality of predefined control states, the display attribute being a node attribute that controls the visual appearance of the node in the tree and that has at any time one display state, the display state being one of a plurality of predefined display states;

changing the control attribute of a node having a parent-node; then setting the display attribute of the node to a display state determined by the control state of the control attribute of the node and the display state of the display attribute of the parent-node according to predefined display rules; and then displaying the node, the visual appearance of the node being controlled by the display attribute of the node.

19. The computer program product of claim 18, further being operable to cause data processing apparatus to perform the step of:

making the display attribute of the node visible.

20. The computer program product of claim 19, wherein the node defines a sub-tree of the tree, the product further being operable to cause data processing apparatus to perform the step of:

setting the display attribute and making the display attribute visible for each sub-node of the sub-tree of the tree.

21. The computer program product of claim 18, wherein setting the display attribute comprises:

setting the display attribute of the node to a first display state if the control attribute of the node has a first control state and the display attribute of the parent-node has the first display state;

setting the display attribute of the node to a second display state if the control attribute of the node has a second control state; and setting the display attribute of the node to a third display state if the control attribute of the node has the first control state and the display attribute of the parent-node has the second display state or the third display state.

22. The computer program product of claim 18, further being operable to cause data processing apparatus to perform the steps of:

prompting a user with the tree; and receiving a request from the user to change the control attribute of the node having a parent-node.

23. The computer program product of claim 22, further being operable to cause data processing apparatus to perform the step of:

the display attribute of each node of the tree visible.

24. A computer program product, tangibly embodied in an information carrier, the computer program product having a plurality of instructions operable to cause data processing apparatus to perform the steps of:

providing a tree, the tree having a plurality of nodes, wherein each node has a propagation attribute, a control attribute and a display attribute, the propagation attribute being a node attribute that defines how node properties of a node at a specific hierarchy level are forwarded to child nodes at the next lower hierarchy level and that has at any time one propagation state, the propagation state being one of a plurality of predefined propagation states, the control attribute being a node attribute that has at any time one control state, the control state being one of a plurality of undefined control states, the display attribute being a node attribute that controls the visual appearance of the node in the tree and has at any time one display state, the display state being one of a plurality of predefined display states;

changing the control attribute of a node, wherein the node defines a sub-tree of the tree; each node of the sub-tree having a parent-node; then setting the propagation attribute of each node of the sub-tree to a propagation stated determined by the control state of the control attribute of the node and the propagation state of the propagation attribute of the corresponding parent-node according to predefined propagation rules; then setting the display attribute of each node of the sub-tree to a display state determined byte control state of the control attribute of the node and the propagation state of the propagation attribute according to predefined display rules; and displaying the node, the visual appearance of the node being controlled by the display attribute of the node.

25. The computer program product of claim 24, wherein setting the propagation attribute for each node of the sub-tree comprises:

setting the propagation attribute of the node to a first propagation state if the control attribute of the node has a first control state and the propagation attribute of the node's parent-node has the first propagation state; and otherwise, setting the propagation attribute of the node to a second propagation state.

26. The computer program product of claim 25, wherein setting the display attribute for each node of the sub-tree comprises:

setting the display attribute of the node to a first display state if the control attribute of the node has the first control state and the propagation attribute of the node has the first propagation state;

setting the display attribute of the node to a second display state if the control attribute of the node has the second control state and the propagation attribute of the node has the second propagation state; and setting the display attribute of the node to a third display state if the control attribute of the node has the first control state and the propagation attribute of the node has the second propagation state.

27. A computer system comprising at least a computer; the computer running a computer program to:

provide a tree, the tree having a plurality of nodes, wherein each node has a control attribute and a display attribute, the control attribute being a node attribute that has at any time one control state, the control state being one of a plurality of predefined control states, the display attribute being a node attribute that controls the visual appearance of the node in the tree and that has at any time one display state, the display state being one of a plurality of predefined display states;

change the control attribute of a node having a parent-node; then set the display attribute of the node to a display state determined by the control state of the control attribute of the node and the display state of the display attribute of the parent-node according to predefined display rules; and display at least a portion of the tree on a display device in accordance with the respective display states of the nodes of the tree.

28. The computer system of claim 27, wherein the computer further makes the display attribute of the node visible.

29. The computer system of claim 28, wherein the node defines a sub-tree of the sub-node of the sub-tree, and the system sets the display attribute and makes the display attribute visible for each sub-node of the sub-tree.

30. The computer system of claim 27, the computer further running a computer program to:
provide a user interface, the user interface prompting a user with the tree, the user interface further receiving a request from the user to change the control attribute of the node, wherein the node defines a sub-tree of the tree;
change the control attribute of the node in response to the request; then
set the display attribute of each node of the sub-tree to a display state determined by the control state of the control attribute of the node and the display state of the display attribute of the node's parent-node according to the predefined display rules; and then
make the adjusted-display attribute of each node of the sub-tree visible through the user interface.

31. A computer system comprising:
at least a computer;
the computer providing a tree, the tree having a plurality of nodes, wherein each node has a control attribute, a display attribute, and a propagation attribute, the propagation attribute being a node attribute that defines how node properties of a node at a specific hierarchy level are forwarded to child nodes at the next lower hierarchy level and that has at any time one propagation state, the propagation state being one of a plurality of predefined propagation states, the control attribute being a node attribute that has at any time one control state, the control state being one of a plurality of predefined control states, the display attribute being a node attribute that controls the visual appearance of the node in the tree and has at any time one display state, the display state being one of a plurality of predefined display states;
the computer further changing the control attribute of a node, wherein the node defines a sub-tree of the tree;
the computer then setting the propagation attribute of each node of the sub-tree to a propagation stated determined by the control state of the control attribute of the node and the propagation state of the propagation attribute of the corresponding parent-node according to predefined propagation rules;
the computer then setting the display attribute of each node of the sub-tree to a display state determined by the control state of the control attribute of the node and the propagation state of the propagation attribute of the node according to predefined display rules; and
the computer displaying the node, the visual appearance of the node being controlled by the display attribute of the node.

* * * * *

UNITED STATES PATENT AND TRADEMARK OFFICE
CERTIFICATE OF CORRECTION

PATENT NO. : 7,197,701 B2
APPLICATION NO. : 10/278737
DATED : March 27, 2007
INVENTOR(S) : Christoph Hofmann It is certified that error appears in the above-identified patent and that said Letters Patent is hereby corrected as shown below:

On cover page, Item (30) should be added below item (22) as follows:
--(30) Foreign Application Priority Data
Oct. 19, 2001 (EP) ........................... 01124964.6--

Signed and Sealed this

Fourteenth Day of August, 2007

JON W. DUDAS
*Director of the United States Patent and Trademark Office*